Sept. 13, 1960  J. R. DENISE  2,952,126
COMBUSTION UNIT FOR SUPPLYING HOT GAS FOR JET AIRCRAFT
Filed May 10, 1955  3 Sheets-Sheet 1

INVENTOR.
J. DENISE
BY
Charles S. Hagaghey
atty.

Sept. 13, 1960   J. R. DENISE   2,952,126
COMBUSTION UNIT FOR SUPPLYING HOT GAS FOR JET AIRCRAFT
Filed May 10, 1955   3 Sheets-Sheet 2

INVENTOR.
J. DENISE
BY
Charles S. Haughey
att.

Sept. 13, 1960   J. R. DENISE   2,952,126
COMBUSTION UNIT FOR SUPPLYING HOT GAS FOR JET AIRCRAFT
Filed May 10, 1955   3 Sheets-Sheet 3
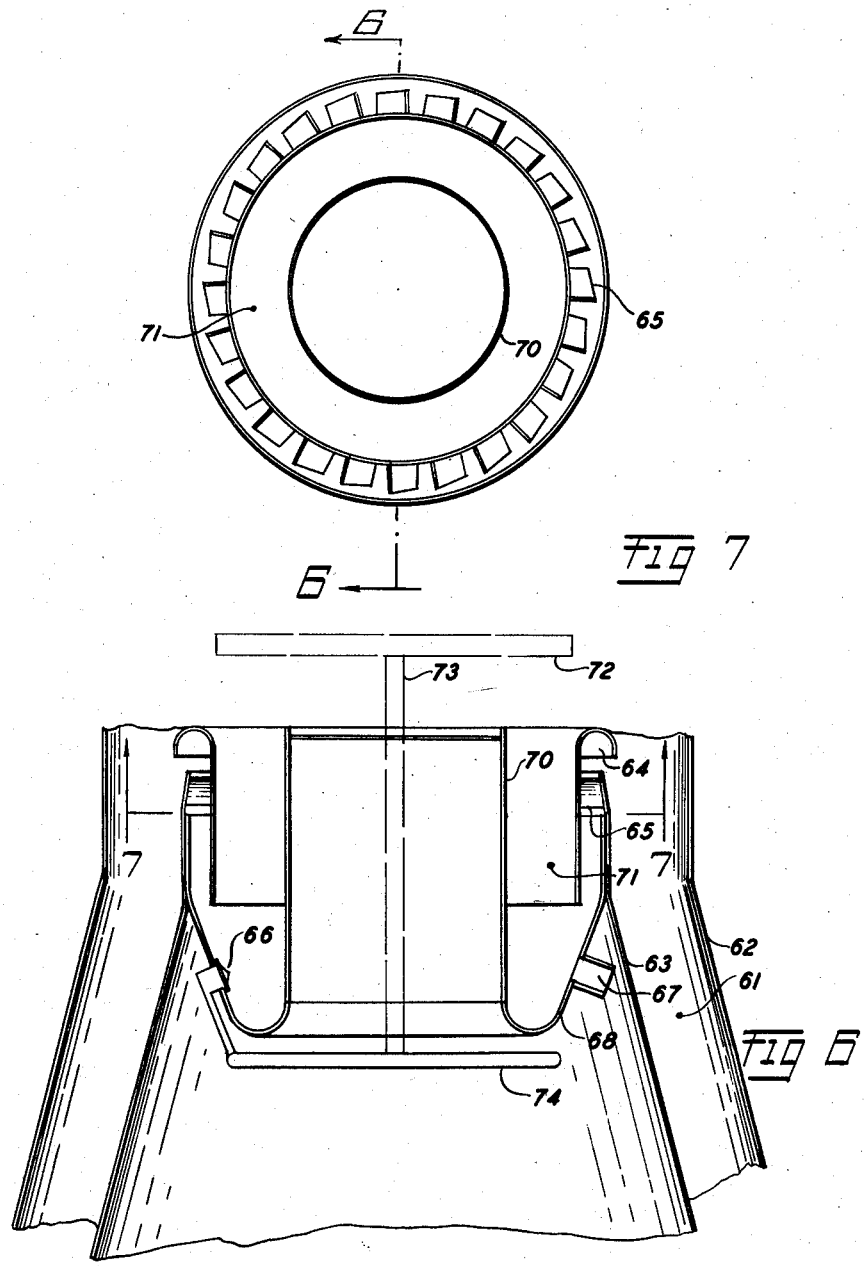
INVENTOR.
J. DENISE

United States Patent Office 2,952,126
Patented Sept. 13, 1960

2,952,126

COMBUSTION UNIT FOR SUPPLYING HOT GAS FOR JET AIRCRAFT

John R. Denise, Columbus, Ohio, assignor, by mesne assignments, to Midland-Ross Corporation, Cleveland, Ohio, a corporation of Ohio Filed May 10, 1955, Ser. No. 507,249

5 Claims. (Cl. 60—39.74)

This invention pertains to a means of heating a gas and more particularly to a combustion unit for a jet aircraft. The unit may be located between the compressor and gas turbine or as an augmentor at the discharge end of the turbine.

In the former application, such a chamber must supply large quantities of heat to large volumes of air emitting from the compressor at high velocities. The major problems resulting from this are the attainment of a stable flame, thorough mixing of the fuel and air to assure efficient combustion, and temperature uniformity of the heated air and products of combustion.

The foregoing must be accomplished with a minimum pressure drop occurring in the air stream. Furthermore, the weight of the combustion unit must be kept to a minimum.

In the latter application, when the combustion unit is modified and used as an augmentor, the above advantages likewise are present, only being applied to heat a stream of air diluted with flue products instead of air alone.

My invention proposes an improved combustion unit that permits greater flame stability and temperature uniformity, with a smaller pressure drop and less overall weight. It may be generally considered as an improvement on the invention claimed in the application Serial No. 334,002, now Patent No. 2,775,238 of D. J. Clark and M. S. Decker which is assigned to the assignee of this application.

For a further consideration of what I believe to be novel and my invention, refer to the attached drawing, and the specification and claims.

Figure 1:
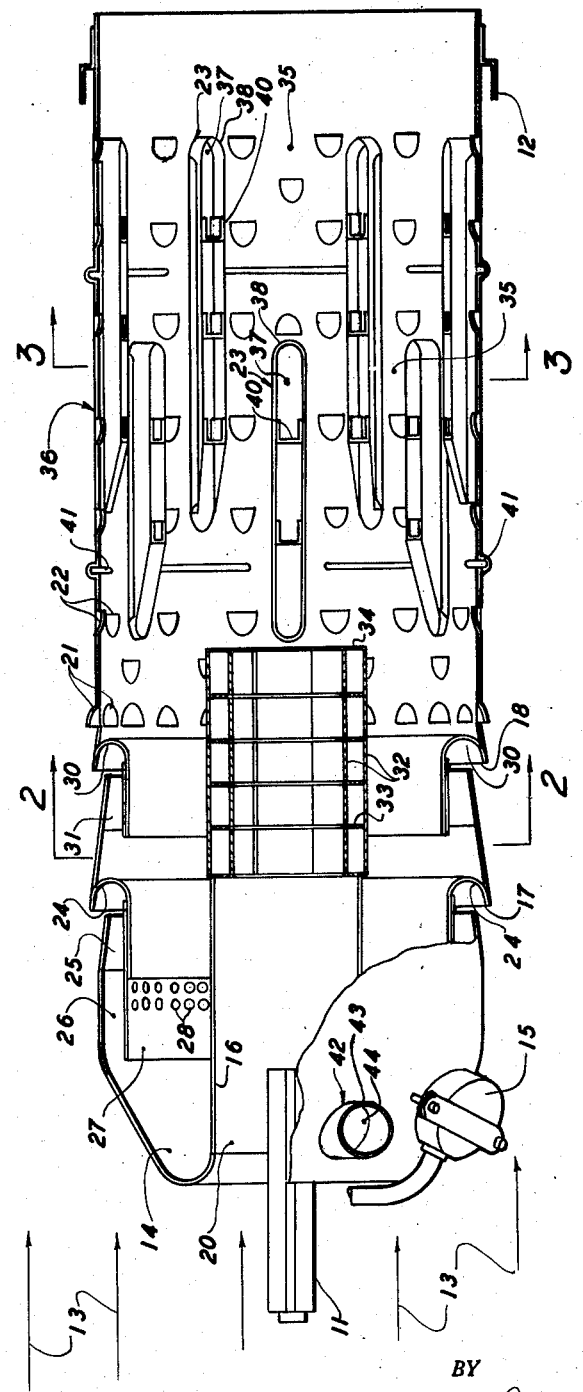
Figure 1 shows a sectional view taken on line 1—1 of Figure 2 of a combustion chamber embodying my invention.
Figure 2:
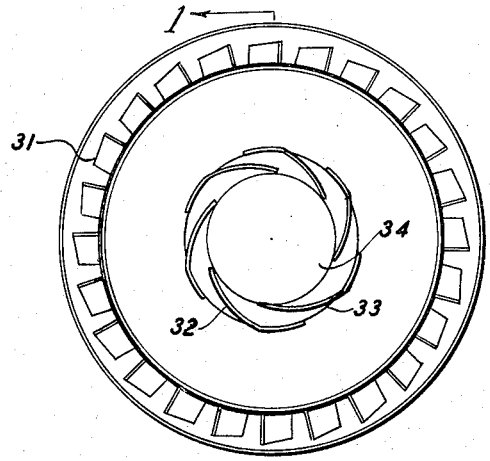
Figure 2 illustrates a sectional view taken on line 2—2 of Figure 1.
Figure 3:
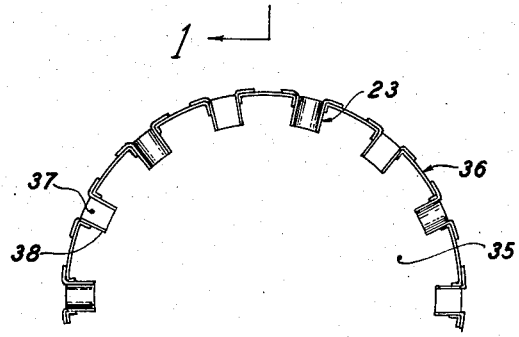
Figures 4, 5:
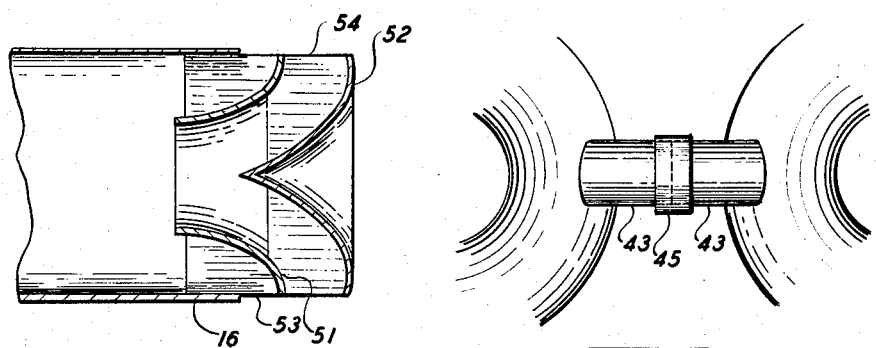

Figure 3 discloses a partial sectional view on line 3—3 of Figure 1;

Figure 4 shows an alternate design of a portion of Figure 1;

Figure 5 illustrates the method of joining two of the units shown in Figure 1;

Figure 6 discloses another application of my invention as a sectional view on line 6—6 of Figure 7; and Figure 7 shows a sectional view on line 7—7 of Figure 6.

Referring to the drawings, and more particularly to Figure 1: The combustion can is held in an air stream by support means (not shown) connected to projection 11 and hooks 12. These may be of a variety of configurations which will depend on the physical limitations of the proposed installation. The direction of air flow is indicated by arrows 13.

Fuel is injected into annular chamber 14 by nozzles 15, of which two or more are generally used. These nozzles may emit fuel in a conical pattern directed toward inner tube 16. Tests have shown that fuel may be injected upstream of this point, including into the air stream upstream of the can itself, and good results will still be obtained.

Air enters through annular scoops 17 and 18, central passage 20 formed by inner tube 16, small scoops 21 and 22, and slots 23. The air that enters scoop 17 is turned in a reverse direction by annular groove 24. This air is then forced to spin in a helical manner by vanes 25, generally placed at an angle of 15° to 20° to the axis of the unit, as it enters annular chambers 26 and 14. In the latter chamber, the spinning air is mixed with fuel from nozzle 15 and ignited. The axial component of the direction of flow of the spinning gases then is sharply changed and the mixture travels down chamber 27, retaining the helical spin. This spin occurs around inner tube 16 and has an axial component of the direction of flow toward the downstream end of the unit. Holes 28 permit a small amount of air to short circuit chamber 14 and create additional turbulence that further aids mixing of the fuel and air.

Air, entering scoop 18, is likewise reversed in direction by annular groove 30. Vanes 31 impart a helical spin to the air with a direction of rotation and axial direction of flow substantially opposite to that of the mixture in chamber 27. This air joins the mixture, creates further turbulence, and accelerates combustion.

That air entering central chamber 20 is emitted outwardly through vanes 32 which are secured by lateral members 33. These vanes are cross-sectioned here for greater clarity. A disc 34, attached to the end of tube 16, prevents air from travelling axially down the main chamber 35. The spin imparted to this central air creates additional turbulence of the aforementioned mixture and tends to maintain the entire mixture and air near the periphery of chamber 35. This permits good temperature uniformity of the exiting combustion products due to the elimination of a central hot core of gases generally inherent in such combustion units, without producing an undesirable cold gas core. The emission of this air must occur after burning of the mixture has progressed sufficiently to insure against extinguishing the flame.

A modification of this inner tube 16 which has been found to be effective also, is the design shown in Figure 4. In this case, vanes 51 and 52, of annular cross-section and supported by ribs 53 and 54, emit air radially but without spin. This method likewise creates good turbulence with the spinning mixture and prevents the formation of a hot core. A further modification would be the substitution of holes in the wall of tube 16 for the vanes.

Air entering scoops 21 and 22 flows along the inner surface of tubular wall 36 and serves to maintain a lower temperature thereof. This, plus the overall construction of the combustion chamber including blisters 41 which serve as stiffeners for wall 36, has permitted a weight reduction of more than 10% by allowing the use of thinner metal. This reduction is significant because of the importance of weight consideration in an aircraft and because as many as ten or more of these chambers may be used in a single aircraft engine so that a weight reduction will be multiplied accordingly.

Slots 23 comprising opening 37, inner projecting walls 38, and partitions 40 allow the entering air to penetrate the hot gases in chamber 35 relatively deeply. This penetration permits further temperature uniformity due to turbulence created with the spinning gases and also allows secondary combustion with any residual fuel. This is taught in Patent 2,488,911 to Hepburn and Barber entitled, "Combustion Apparatus for Use with Turbines."

Cross ignition port 42 comprises a duct 43 and a hole 44 in the end wall of this unit shown here as a frusto-conical shape. A similar port is placed on the other side of the cone so that the two are symmetrical with a vertical center line intersecting the axis of the cone. These ports are connected to similar ports on adjacent chambers and permit but one such chamber, in a ring containing a plurality of them, to contain an ignition means. Such a means generally is a spark plug also placed on the cone and projected a fraction of an inch into chamber 14. A portion of the flame thus produced is then transmitted to the other chambers by means of these ports.

The placement of these ports on the face of the cone presents a distinct advantage due to the static pressure at the cone and the absence of hot areas as created downstream of the port. Such ports in prior designs generally must be placed further toward the discharge end and on a surface parallel to the axis of the chamber. This placement is necessary due to the design and method of fuel injection, but the hot areas created by such positioning serve to shorten the effective life of the apparatus or necessitate reinforced construction at such areas.

Figure 5 shows more fully how this port is connected to a port on an adjacent unit by a sleeve 45. The pressure created by the spinning mixture against the end wall aids in transferring flame from one unit to another through ports.

Inner tube 16 receives on its outer surface a liquid portion of the fuel, preferably a liquid, from nozzle 15. This fuel may come directly from the nozzle, may be ejected from the air-fuel mixture as it is caused to change direction, or a combination of both. This deposited fuel serves as a flame retainer and stabilizer. In tests, when the fuel is shut off, the flame immediately recedes to a point where a small flame is observed to whirl around the outer surface of tube 16 until fuel thereon is depleted. This is extremely useful in the prevention of blow-off and hence flame-out during periods of deceleration in which the amount of fuel is temporarily decreased to a greater extent than the volume of air. During periods of acceleration, temporary flooding of the apparatus occurs and the deposition of fuel on the inner tube tends to stabilize the flame front which in prior designs normally oscillates during such periods.

A variation of my invention is adaptable for use as an augmentor as disclosed in Figure 6. The combination air and flue product mixture travels down annular duct 61 from the turbine. This duct is formed between an outer shell 62 and a conical core 63, only portions of which are shown. The combustion unit is placed in the downstream end of the core. A portion of the gases enter scoop 64, is reversed in direction, and spun by vanes 65. The portion then has fuel injected into it by a plurality of nozzles 66 and is ignited by a pilot or spark plug (not shown) in hole 67 as it travels in a helical manner toward the upstream end of end wall 68. The axial component of flow of the ignited mixture is reversed in direction and the mixture then travels helically along inner tube 70 and passes out the downstream end of annular chamber 71. Inner tube 70 acts as a core for the deposition of a liquid portion of the fuel to serve as a flame retainer and stabilizer as heretofore explained and to form the annular chamber 71. Additional fuel may be supplied by a spray bar indicated at 72 which may be fed by a pipe 73 connected to fuel manifold 74.

Other advantages and variations of my invention will be apparent from the foregoing description and drawing which are intended in an illustrative and not a limiting sense.

I claim:

1. In a combustion unit for supplying heated products of combustion to a high velocity ducted air stream, in combination: a substantially continuous, toroidal segment sheet metal wall disposed in said air stream with its axis parallel with the direction of flow of said stream and having a cylindrical inner wall portion, an outer wall portion, and an interconnecting upstream end wall portion; air inlet means comprising an annular scoop extending into said air stream and spin imparting means for redirecting a portion of said air stream around the downstream edge of said segment outer wall portion and along the inner surface of the outer portion with a component of spin in the said air stream portion, whereby to cause said air stream portion to spin along said outer wall portion, around the substantially continuous surface of said segment to the outer surface of said inner wall portion and therealong to substantially downstream of said scoop; a closure wall on said inner wall portion for preventing axial discharge of air from the center thereof; and nozzle means for discharging fuel into said airstream portion as said airstream portion flows along the inner surface of the outer wall portion.

2. A combustion unit according to claim 1 having, in combination: a plurality of radially discharging air ports in said cylindrical inner wall portion downstream of said annular scoop.

3. A combustion unit according to claim 1 having, in combination: a cylindrical combustion chamber wall extending downstream from said air scoop and forming a plurality of air inlet ports for discharging air radially inwardly.

4. A combustion unit according to claim 1 having, in combination: ignition means along the toroidal wall downstream of the nozzle means for igniting fuel and air mixture as it flows along said toroidal segment wall.

5. A plurality of combustion units as defined by claim 1 interconnected by tubular ducts joining said units between said toroidal segment walls, connecting adjacent units on the outer wall portions in the same lateral plane as the nozzle means, said tubular ducts serving to provide cross-ignition from adjacent, interconnected units.

References Cited in the file of this patent

UNITED STATES PATENTS

| 1,725,510 | Fiske | Aug. 20, 1929 |
|---|---|---|
| 2,525,207 | Clarke et al. | Oct. 10, 1950 |
| 2,531,810 | Fyffe | Nov. 28, 1950 |
| 2,552,851 | Gist | May 15, 1951 |
| 2,621,477 | Powter et al. | Dec. 16, 1952 |
| 2,667,033 | Ashwood | Jan. 26, 1954 |
| 2,679,136 | Gaubatz | May 25, 1954 |
| 2,687,010 | Ellis | Aug. 24, 1954 |
| 2,720,753 | Sharpe | Oct. 18, 1955 |
| 2,775,238 | Clark et al. | Dec. 25, 1956 |
| 2,801,520 | Highberg | Aug. 6, 1957 |
| 2,828,605 | Dobson | Apr. 1, 1958 |

FOREIGN PATENTS

| 691,366 | Great Britain | May 13, 1953 |